June 12, 1956 — S. BAKEWELL — 2,749,602
VALVE ASSEMBLY MACHINE
Filed June 4, 1952 — 6 Sheets-Sheet 1

INVENTOR.
SIDNEY BAKEWELL
BY Robert A. Sloman
ATTORNEY

June 12, 1956  S. BAKEWELL  2,749,602
VALVE ASSEMBLY MACHINE
Filed June 4, 1952  6 Sheets-Sheet 2

INVENTOR.
SIDNEY BAKEWELL.
BY
Robert A. Sloman
ATTORNEY

June 12, 1956
S. BAKEWELL
2,749,602
VALVE ASSEMBLY MACHINE
Filed June 4, 1952
6 Sheets-Sheet 3
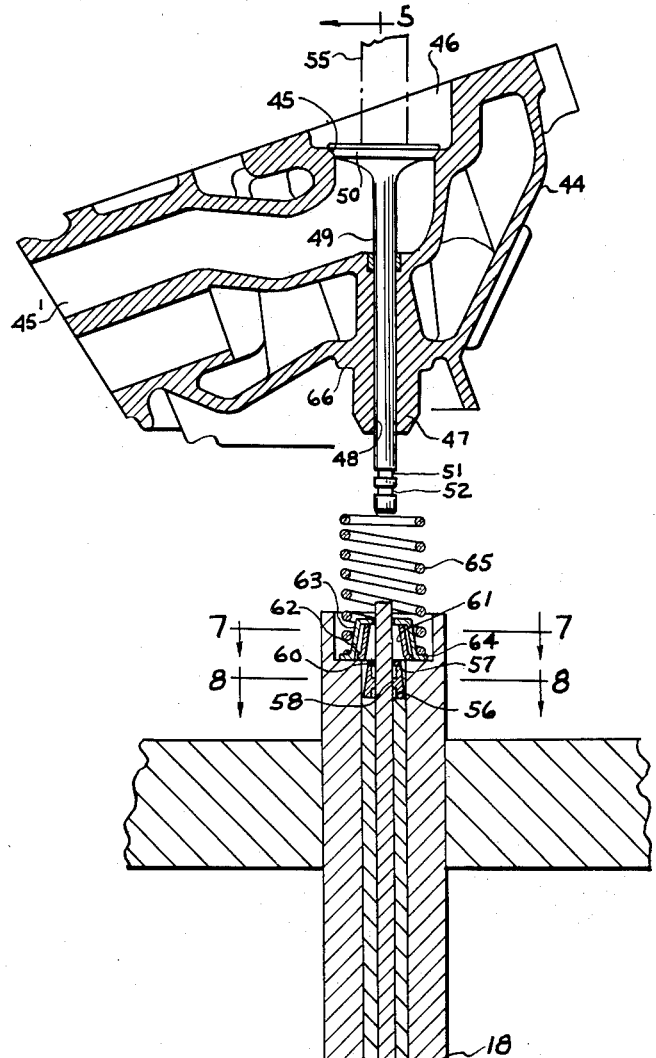
Fig. 4
INVENTOR.
SIDNEY BAKEWELL.
BY 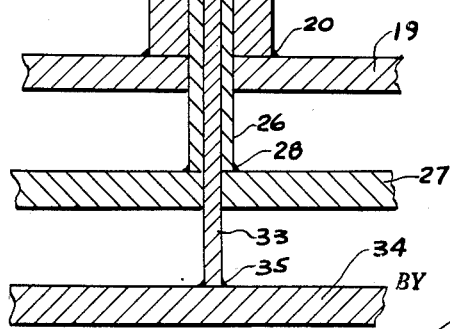
ATTORNEY

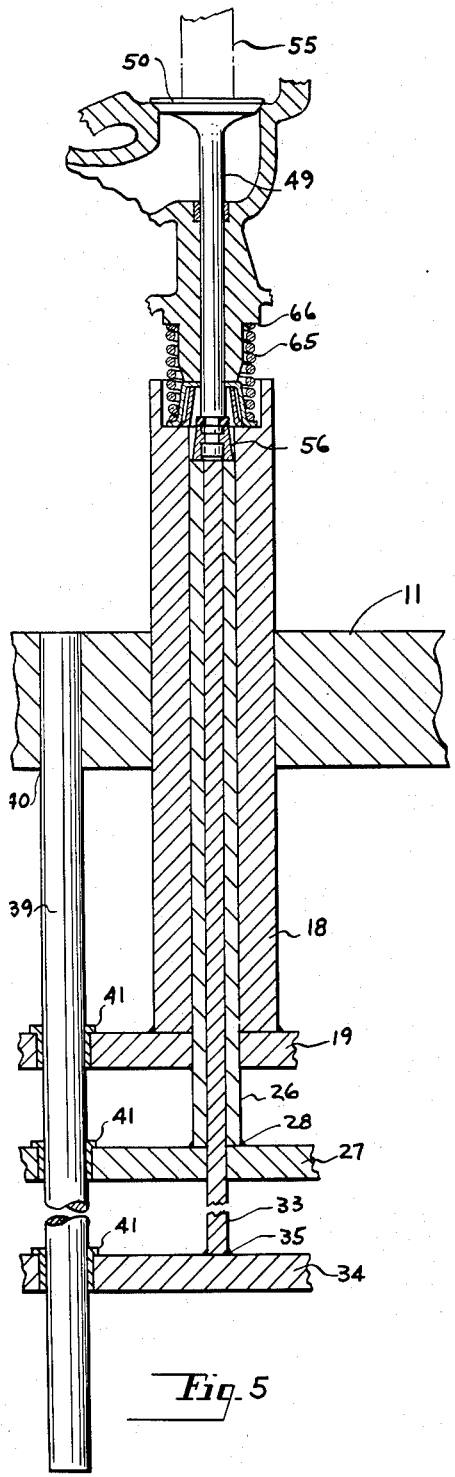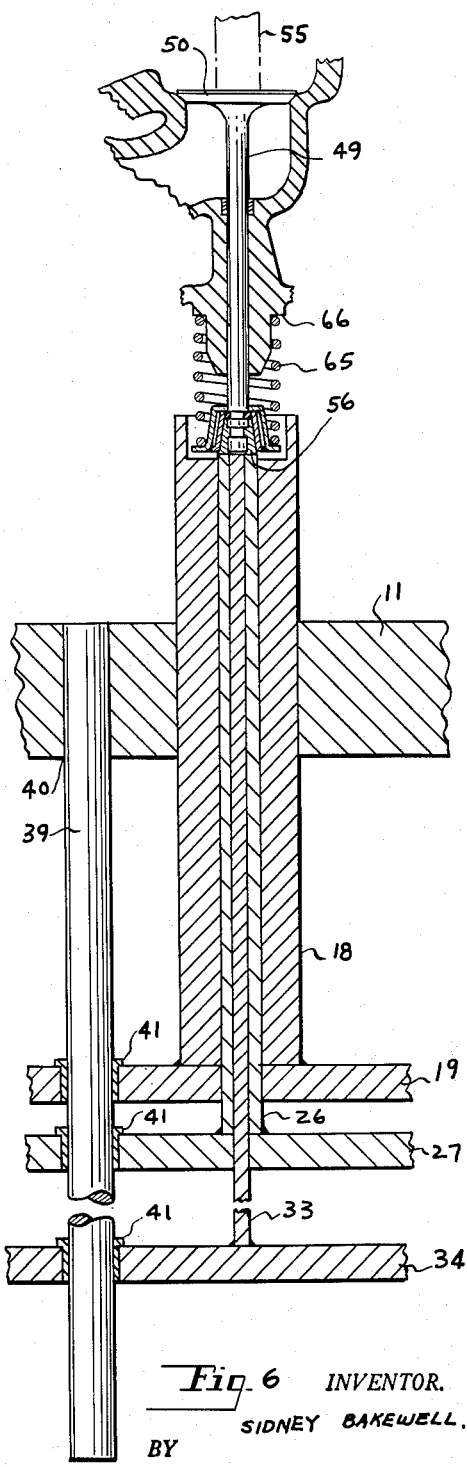

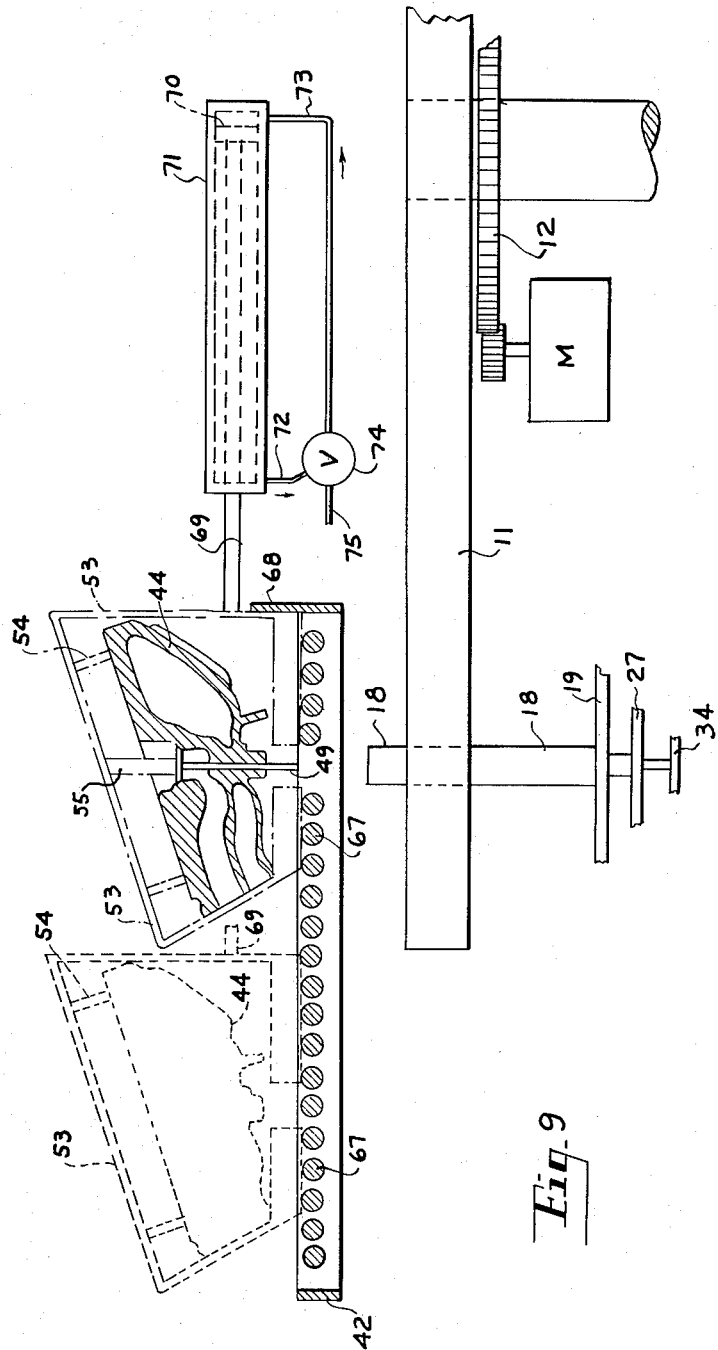

June 12, 1956   S. BAKEWELL   2,749,602
VALVE ASSEMBLY MACHINE
Filed June 4, 1952   6 Sheets-Sheet 6
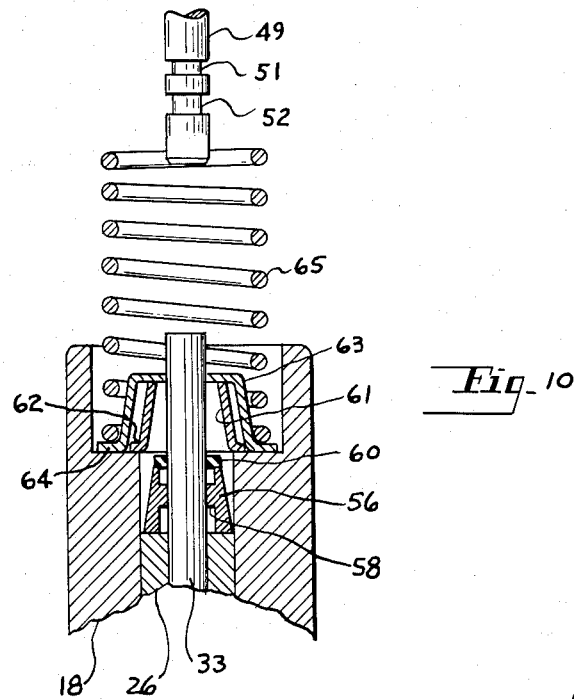
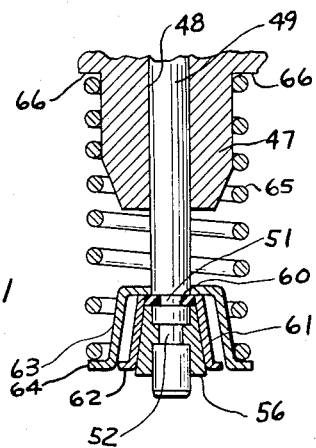
INVENTOR.
SIDNEY BAKEWELL
BY
Robert A. Sloman
ATTORNEY.

United States Patent Office 2,749,602
Patented June 12, 1956

2,749,602

VALVE ASSEMBLY MACHINE

Sidney Bakewell, Detroit, Mich.

Application June 4, 1952, Serial No. 291,711

6 Claims. (Cl. 29—208)

This invention relates to a valve assembly machine, and more particularly to a device for automatically assemblying and securing the valves within the cylinder head of an engine.

It is the object of the present invention to provide a simplified and automatic mechanism whereby the various parts which secure and spring bias a valve within an engine cylinder head may be automatically and quickly assembled mechanically.

It is the further object of this invention to provide a labor saving device which is fully effective in simultaneously assemblying the various parts in connection with all of the various valves in a particular cylinder head at one time.

It is the further object of this invention to provide a cartridge upon an index table whereby said cartridge as it is intermittently rotated and stopped may be successively loaded with various parts in telescoped relation so that at a predetermined position of said loaded cartridge, with respect to the stem of a valve loosely assembled within a cylinder head, said cartridge may be upwardly projected for assemblying and mounting and securing the various parts in connection with said valve stem and cylinder head.

It is the further object of this invention to provide a conveyor mechanism for the cylinder heads whereby the valves may be loosely assembled within the cylinder head and wherein said conveyor is positioned adjacent to the cartridge supporting index table so that the particular cylinder head may be moved over the table with the particular valve stem in axial registry with a pre-loaded cartridge.

It is the further object of this invention to provide a novel method of automatically assemblying and spring biasing valves within a cylinder head, which is not only simplified, inexpensive, but which increases and speeds up the production of the said cylinder heads with their valves spring biased thereon.

These and other objects will be seen in the following specification and claims in conjunction with the appended drawings in which:

Fig. 4 is an elevational section of the cartridge construction illustrating its axial registry with the depending valve stem loosely mounted within a cylinder head.

Fig. 5 is a section taken on line 5—5 of Fig. 4 illustrating the relative position of the parts during the assembly operation.

Fig. 6 is a similar view illustrating the relationship of the parts subsequent to the assembly operation.

Fig. 9 is a diagram illustrating the relation between the rotary index table, the conveyor, and the cylinder head supporting fixture.

Fig. 10 is an enlarged fragmentary section of a portion of the illustration of Fig. 4 illustrating the valve locking assembly before mounting upon the valve stem.

Fig. 11 is an enlarged fragmentary section of a portion of the illustration of Fig. 6 illustrating the locking assembly after positioning and securing upon the valve stem in connection with the cylinder head which is fragmentarily shown.

It will be understood that the above drawings illustrate merely one preferred embodiment of the invention and that other embodiments are contemplated within the scope of the claims hereafter set forth.

Figure 1:
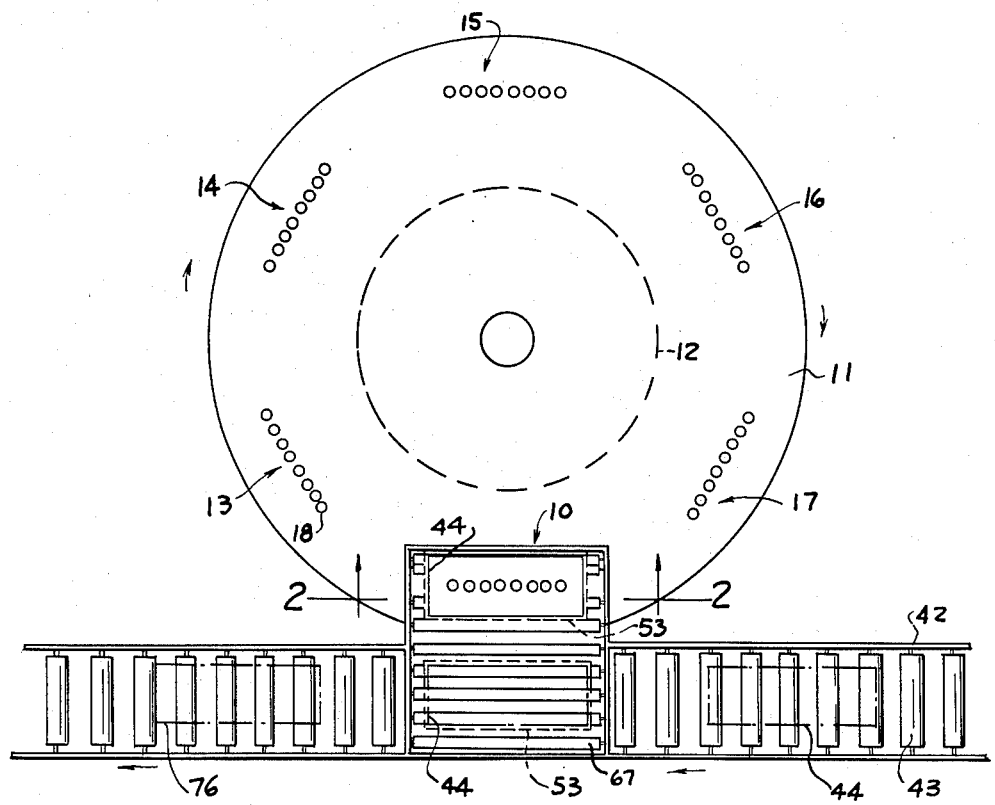
Fig. 1 is a plan view of the rotary index table for the valve assembly machine illustrating the position of the cartridges thereon, and the association of a cylinder head conveyor in conjunction with said table.

Referring to Fig. 1 of the drawings, the present valve assembly machine includes a rotatable index table 11 with indexing means 12 shown in dotted lines and arranged upon the under-side thereof. There are illustrated a plurality of circularly spaced cartridge loading stations 13, 14, 15, 16 and 17, and the final valve assembly station 10. Corresponding to each of the stations 13 through 17 as well as station 10, there are formed through the table 11 a plurality of spaced apertures arranged in rows within which are positioned the vertically adjustable cartridges generally indicated at 18.

In the manner hereafter described each cartridge will be loaded with the various parts for assemblying the valves within a cylinder head. Each of the cartridges 18 in the particular group are so spaced as to correspond to the spacing of the valve stems to be positioned and secured within an engine cylinder head, and of course, correspond to the number of valves to be so assembled.

It is the purpose of the present invention to provide for the progressive loading of the cartridges 18 between stations 13 and 17 upon intermittent indexing of the rotary table 11 so that when a particular group of cartridges reaches the position or station 10 the cartridges will be fully loaded so that the valve assembly machine will operate for upwardly projecting the various assembled parts employed into axial securing registry with the depending valve stem which was theretofore mounted loosely within an engine cylinder head.

The various parts which are employed in the hereafter described automatic operation include the cylindrical split locking keys 56, shown in Fig. 4, one of which is loaded within each of the cartridges 18 at station 13. The seal 60, shown in Fig. 4, is thereafter assembled within each of the cartridges 18 by a worker standing in adjacent position 14. Next, the conically shaped sleeve 61 is loaded from position 15 into each of the cartridges 18. At position 16 the conically shaped spring retainer 63 is positioned within each of said cartridges; and finally, in position 17 the coiled springs 65 are respectively inserted within each of the cartridges 18. By this arrangement it is apparent that the various parts to be employed in the valve assembly operation are positioned within cartridge 18 in telescoped relation, and this is fully illustrated in Fig. 4 which shows the completely loaded cartridge in the condition it would be in after final loading of the springs from position 17.

The index table 11 is then rotated to the final assembly position 10, shown in Fig. 1, where the loaded cartridge is shown to be in axial alignment with the downwardly depending free end of the stem 49 of valve 50, which was theretofore loosely positioned within cylinder head 44.

As hereafter described the cartridge 18 and the various parts thereof will be mechanically lifted upwardly in a predetermined timed relation so as to assemble the above described parts upon the valve stem and secure the same with respect thereto and with respect to the cylinder head in the manner illustrated in Figures 4, 5, and 6.

The cartridges 18 heretofore referred to include the outer elongated cylinder also designated by the number 18, which is positioned slidably through the index table 11 and is adapted for vertical sliding adjustment therethrough, as illustrated in Fig. 4.

Each of the outer cylinders 18 for each of the cartridges which are arranged in a particular row, are adapted for movement in unison. For this purpose, there is provided for each group of outer cylinders 18 a horizontally disposed platform 19 upon which all of the cylinders 18 rest and to which said cylinders are secured as by the weld 20, shown in Fig. 4. Consequently, by mechanically moving the platform 19 upwardly or downwardly, it is apparent that there will be a corresponding similar movement of all of the outer cylinders 18 in unison.

Figure 2:
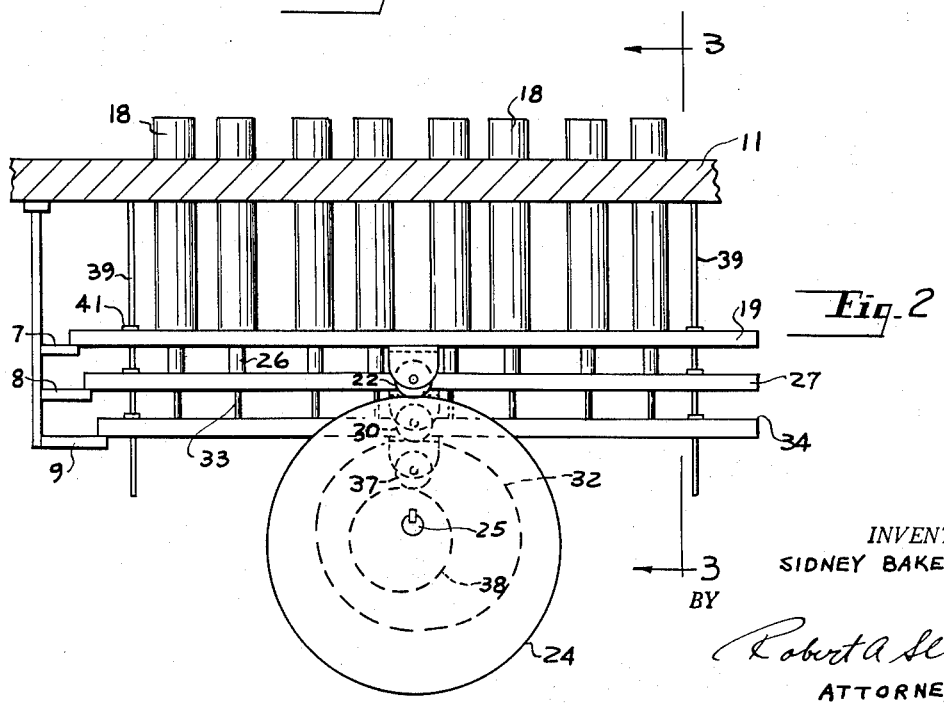
Fig. 2 is a section taken on line 2—2 of Fig. 1.
Figure 3:
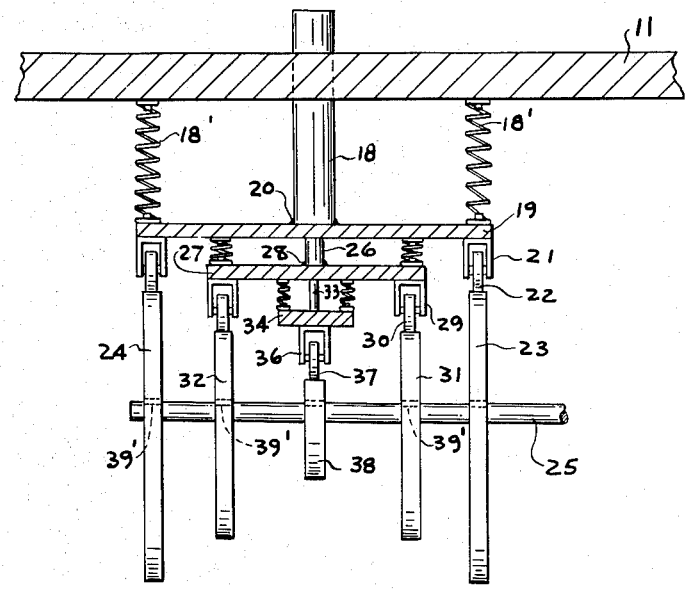
Fig. 3 is a section taken on line 3—3 of Fig. 2.
Figures 7, 8:
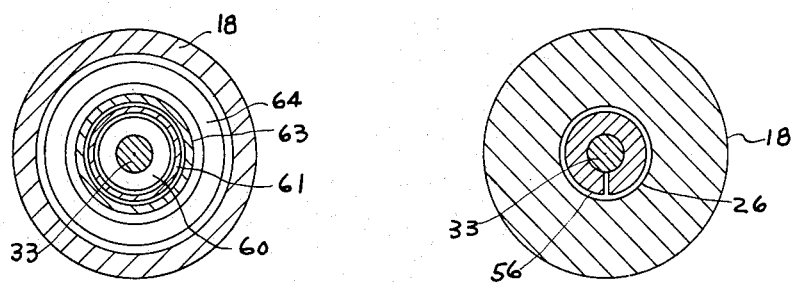
Fig. 7 is a section taken on line 7—7 of Fig. 4.
Fig. 8 is a section taken on line 8—8 of Fig. 4.

Referring to Figures 2 and 3, it is apparent that the platform 19 is supported intermediate its ends in the final loading position 10 upon a pair of rotatable cams 23 and 24, which are keyed as at 39' to the rotatable shaft 25. Intermediate the ends of platform 19 are arranged a pair of downwardly depending bifurcated brackets 21 upon the opposite undersides of platform 19. Within these brackets are separately journaled the rollers 22 which are adapted respectively to ride upon the rotatable cams 23 and 24 in the manner shown in Fig. 3. Thus the platform 19 is supported by cams 23 and 24 and is adapted to rise and fall depending upon the shape of said cams. Naturally, the cams 23 and 24 are of the same shape. The cylinders 18 are normally urged downwardly with respect to table 11 by means of suitable coiled springs 18'.

Slidably positioned within the outer cylinder 18 is a second vertically adjustable cylinder 26 for each of the cartridges 18 and the lower ends of each of the second cylinders 26 are supported upon the second horizontally disposed platform 27, which is spaced below platform 19. The second cylinders 26 are secured to the platform 27, such as by the welds 28. Thus it follows that the second cylinders 26 which form a part of each of the cartridges are also adapted for movement in unison depending upon the control movements of platform 27.

Referring again to Figures 2 and 3, it is seen that this second cylinder supporting platform 27 has provided intermediate its ends upon its undersurface the pair of spaced bifurcated brackets 29 within which are journaled the rollers 30 respectively which are adapted in the valve assembly position 10 for support upon the two formed cams 31 and 32 similarly keyed to rotatable shaft 25 as at 39'. Thus it is apparent upon rotation of shaft 25 and depending upon the shape of cams 31 and 32, that the second cylinders 26 are adapted for vertical adjustment within the outer cylinders 18 and independently of cylinders 18 in a predetermined timed relationship.

As shown in Fig. 4, there is provided within each of the vertically adjustable second cylinders 26, a separately and vertically adjustable and slidable shaft 33 for each of the cartridges. The lower ends of the respective shafts 33 are positioned and supported upon a third horizontally disposed platform 34 and secured thereto as by the welds 35. Here also as shown in Figures 2 and 3, this third platform 34 is supported intermediate its ends by means of a central bracket 36 which journals roller 37 and which in position 10 of Fig. 1 rests upon the rotatable cam 38, which is similarly keyed to rotatable shaft 25. Consequently rotation of shaft 25 will also effect a predetermined timed vertical adjustment of the shafts 33 in unison.

Fig. 2 illustrates that the arrangement of the cams for supporting the various platforms 19, 27 and 34 is only at the loading position 10, and that is the position where the cartridges which have been fully loaded as of position 17 are arranged for final assembly with the depending stems of the valves 49 loosely positioned within cylinder head 44 in the manner shown in Fig. 4. In each of the other positions of the cartridges, such as positions 13, 14, 15, 16 and 17, it is necessary that there be provided upon the underside of the index table suitable stops which will prevent the platforms 19, 27 and 34 from dropping with respect to index table 11. These stops are diagrammatically illustrated in Fig. 2 by the numerals 7, 8 and 9. Upright guide rods 39 are suitably secured to the index table 11 as at 40, Fig. 5, and depend downwardly through the bushings 41 secured within the various plates 19, 27 and 34 for guiding the upward movements of said platforms or plates.

Referring now to Fig. 1, there is provided an elongated conveyor platform 42 having a plurality of transverse spaced rollers 43, with said platform being arranged tangent to the index table 11 at its loading position 10 but above table 11 sufficiently as to be in substantial registry with rollers 67 as indicated in Fig. 9. Thus, the cylinder heads 44 are moved longitudinally upon the conveyor 42—43 and endwise directly through the open end of fixture 53 on roller 67 for positioning opposite the loading position 10, and in this position the cylinder head within fixture 53 may be moved radially inward directly above a portion of the index table 11 adjacent its periphery. In the dotted line position 44 of the cylinder head each of the valves are loosely loaded in position through the corresponding valve receiving openings of the cylinder head in the manner illustrated in Fig. 4, so that the stems 49 depend below said cylinder head. In the manner hereafter described the cylinder head supporting fixture will be moved to the correct position which will accurately effect an axial alignment between the valve stems 49 and the cartridges 18.

Referring again to Fig. 4, it is seen that the valves 49 are so arranged that their heads 50 rest upon the valve seats 45 of cylinder head 44 for controlling the flow or exhaust through the passages 45' formed within cylinder head 44 depending upon whether the valve is an inlet valve or an exhaust valve. Naturally, the various passages 45' terminate in one of the ends of the particular cylinder 46 corresponding to the particular valve 49. It will also be noted that the valve head is formed with a molded portion 47, which is cylindrical in shape, and which is adapted to receive a portion of the spring 65 by which the various valves 49 are biased with respect to cylinder head 44, and it is apparent also that, that portion of the cylinder head is sutably apertured as at 48 to adjustably receive the particular valve 49.

Furthermore, the particular valve stem at its lower end is provided with a pair of longitudinally spaced annular slots 51 and 52. As shown in Figure 6, each slot 51 is adapted to receive and retain the seal 60, whereas slot 52 of said valve stem is adapted to retainingly receive the internal annular flange 58 of the split cylindrical locking sleeve 56 whereby the various parts for the complete valve assembly are secured with respect to the valve stem 49.

Referring to Figure 9, there is provided a suitable fixture 53 diagrammatically indicated, upon which the cylinder head 44 is positioned, and such fixture is adapted to support cylinder head 44 in the correct inwardly adjusted position corresponding to position 10 of Fig. 1, so that each of the pre-assembled valves will be in exact axial registry with the corresponding cartridge 18. It is obvious that the fixture must be so constructed as to suitably support and anchor the cylinder head in the desired position shown diagrammatically in Fig. 9, and there is shown also the locking clip 54, diagrammatically, which tends to anchor the cylinder head in the desired position with respect to fixture 53.

During the valve assembly operation whereby the valve is spring-biased with respect to the cylinder head, it is essential that the various valves be held against longitudinal displacement. This is accomplished by means of the retaining fingers 55, such as diagrammatically illustrated in Fig. 4.

Referring again to Fig. 4 as well as Fig. 1, it is understood that when the index table supporting a particular group of spaced cartridges 18 is in station 13, each of the said cartridges will receive one split cylindrical key 56 which is tapered upwardly inward as at 57 and which has upon its interior surface the annular flange 58 adapted to snap over and be retained within the lowermost annular slot 52 on valve stem 49. In position 14 of index table 11 a worker will mount within each of the cartridges 18 and over the shaft 33 one seal 60. Furthermore, it will be noted that each of the split locking sleeves 56 are axially aligned over the respective shaft 33 which serves to guide the locking sleeve 56, as well as the seal 60, down into the cartridge. It will also be noted that the locking sleeve 56 as well as the seal 60 are supported upon the second cylinder 26 within cylinder 18.

In loading position 15 of index table 11, the conical sleeves 61 are each respectively loaded within the outer cylinder 18. Said outer cylinder at its upper end has an internal portion of increased diameter thereby defining a supporting ledge upon which rests the lower annular flange 62 of sleeve 61.

In position 16 of index table 11, each of the conically shaped spring retainers 63 are loaded within the cartridges 18 with their respective lower-most annular flanges 64 resting within the ledge formed in the upper end of the outer cylinders 18. In the final loading position 17 the various coil springs 65 are manually inserted within each of the cartridges and rest at their lower ends upon the flanges 64 of spring retainers 63, all in the manner illustrated in Fig. 4.

It is apparent from the above description that locking sleeve 56, as well as seal 60, are supported upon the interior or second cylinder 26 and are adapted for vertical adjustments depending upon the adjustment of said cylinder. It is also noted that in the loading position the locking sleeve 56 as well as the seal 60, are positioned within the interior of outer cylinder 18. Furthermore, sleeve 61 as well as spring retainer 63, are mounted upon the upper end of outer cylinder 18 and are adapted for movement therewith as is also the coiled spring 65.

It will be noted that each of the parts 56, 60, 61, 63 and 65 are arranged in axial alignment and in telescoped relationship with respect to each other and with respect to the cartridge which has been generally indicated also by the numeral 18.

As shown in Fig. 4, the downwardly depending formed portions 47 of cylindrical shape which are adapted to axially receive and center the springs 65, have formed portions 66 which act as seats for the upper ends of the springs 65 in the manner illustrated in Figures 5 and 6 wherein it is seen that the spring has been projected upwardly over the formed portion 47 of the cylinder head 44.

The relationship of the loaded cylinder 18 with respect to the index table 11 corresponds to position 17 shown in Fig. 1 where all of the various parts to be employed in the final valve assembly operation are now inserted within the cartridge 18, and upon the next rotary adjustment of index table 11 will be positioned within the final loading position 10, and this of course, corresponds to the illustration of Fig. 4 of the drawing. Here it is clear that each of the cylinders 18 are arranged in exact axial registry with the stem 49 of the valve 50 loosely positioned within cylinder head 44.

Operation

Referring to Figure 5 of the drawing, it is apparent that rotation of the cam 38 with the shaft 25 has elevated the platform 34 and each of the shafts 33 so that the upper ends of said shafts, which as shown in Fig. 4 are spaced from the lower ends of valves 49, have been moved upwardly into contact with the lower end of the valve stem 49 at Fig. 5. The shaft 33 thus acts as a guide for the upward movement of all the valve assembly parts, and particularly for the seal 60 and the cylindrical locking key 56 in guiding the same onto the lower end of the valve stem 49. It will also be noted that a finger or other device 55 bears against the upper end of the valve 50 holding the same against longitudinal displacement.

Continued rotation of the cam supporting shaft 25 causes the cams 23 and 24 to rotate to such position as to elevate the outer cylinder 18 to the position shown in Fig. 5. In this position it is apparent that sleeve 61, spring retainer 63 as well as the coiled spring 65, have all been moved upwardly into the position shown, and spring 65 is under compression. It is also noted that the upper portion of the spring retainer 63 bears against the bottom edge of the formed portion 47 of the cylinder head, being held there by outer cylinder 18.

In a predetermined timed relation the second cylinder 26 is moved upwardly by its controlling cams 31 and 32 upwardly projecting the seal 60 forcefully past notch 52 and into the annular notch 51 in valve stem 49 and at the same time upwardly projecting the locking key 56 so that its internal flange 58 registers within the annular slot 52 at the lower end of valve stem 49. This is the position of the parts illustrated in Fig. 5. Seal 60 being flexible expands sufficiently under the upward force of key 56 until it registers with slot 51 in valve stem 49.

In Fig. 6 it appears that due to the shape of the cams 23 and 24 continued rotation of shaft 25 has permitted the outer cylinders 18 to drop downwardly. In turn the sleeve 61 as well as the spring retainer 63 gradually drop down under the control of cylinder 18 to the position shown in Fig. 6 wherein the sleeve is supported upon and over seal 60, as well as locking key 56, and is anchored in position. After this the cylinder 18 drops away as shown in Fig. 6, leaving the spring, the spring retainer, and the sleeve 61 anchored and secured upon the valve stem by means of the key 56; thus completing the valve assembly operation whereby the valve is spring biased with respect to the cylinder head.

By the above construction it is apparent that each of the valves 49 arranged in a row will be simultaneously spring-biased with respect to the cylinder head inasmuch as each of the cylinders 18 as well as the cylinders 26 as well as the shafts 33 move in a predetermined time relationship with respect to each other. This provides an automatic mechanism as well as method for assembling the various parts which make up the spring assembly and mounting for spring biasing the respective valves with respect to the cylinder head 44. This is one preferred embodiment of the invention, and other embodiments are contemplated within the scope of the claims hereafter set forth.

A plurality of laterally spaced rollers 67 are arranged adjacent position 10 shown in Fig. 1 intermediate the ends of conveyor 42 arranged at right angles to rollers 43. Rollers 67 provide a horizontal support for the engine head supporting fixture 53 shown in Fig. 9, which is open at its opposite ends and is so positioned as to permit lengthwise insertion of a cylinder head 44 thereinto. When the head 44 is properly positioned within fixture 53 the fixture is suitably moved axially inward with respect to index table 11, either manually to a fixed stop 68, or by a suitable hydraulic motor.

In the preferred embodiment there is illustrated in Fig. 9, a piston rod 69 connected at one end to the fixture 53 and having at its opposite end a piston 70 within elongated cylinder 71, which may be either hydraulic or pneumatic. There are a pair of fluid lines 72 and 73 which connect the fluid control valve 74 with opposite ends of cylinder 71. Fluid under pressure is supplied to valve 74 by the supply pipe 75. Upon the actuation of valve 74 pressure fluid will be delivered through line 72 moving fixture 73 outwardly above table 11 upon rollers 67 for proper positioning and registry of the loosely assembled valves with respect to the upright cartridges 18 heretofore described with fixture 53 engaging the stop 68 to permit the mechanical valve assembly operation.

After valve assembly, the control valve 74 is adjusted mechanically or automatically for directing pressure fluid through conduit 73 for withdrawing the fixture 53 upon the supporting rollers 67 and returning said fixture to the horizontal conveyor 42. In this position the head so assembled may then be withdrawn from the opposite open end of fixture 53 as indicated by the delivery position 76.

Having described my invention, reference should now be had to the claims which follow for determining the scope thereof.

I claim:

1. In a machine for assembling a valve within a cylinder head, a rotatable index table, a cartridge containing valve assembly parts in telescoped relation consisting of an upright hollow cylinder slidably mounted upon said table and carried thereby throughout rotary movements thereof, the upper end of which having a portion of increased internal diameter defining a support for a bottom sleeve, an intermediate spring retainer and a top coiled spring, a second hollow cylinder slidably mounted within said first cylinder providing a support below said sleeve for a top seal and a bottom split cylindrical locking key, and a shaft slidably mounted within said second cylinder adapted for axial alignment and movement into engagement with the stem of a valve loosely positioned within a cylinder head, means holding said valve against longitudinal displacement, and a plurality of rotatable cams respectively and separately engaging and supporting said cylinders and said shaft for effecting differential timed upward movements of said shaft and cylinders whereby said shaft is projected into engagement with the end of said stem, said sleeve and spring retainer are lifted compressing said spring relative to said cylinder head, said seal and locking key projected upwardly over the lower end of said valve stem and immovably secured thereon, and a subsequent downwardly withdrawal of said first cylinder permitting said spring to expand moving said retainer and sleeve into cooperating retained engagement with said seal and locking key, after which said second cylinder and shaft are withdrawn.

2. The valve assembly machine of claim 1, a horizontal roller support spaced above said table arranged radially thereof, and a fixture movably mounted on said support for supporting said cylinder head.

3. The valve assembly machine of claim 1, a horizontal roller support spaced above said table arranged radially thereof, a fixture movably mounted on said support for supporting said cylinder head, stop means at the inner end of said roller support, and operating means joined to said fixture for moving said fixture radially inward upon said roller support toward the center of said table and engageable with said stop means for effecting axial registry of said valve with said cartridge.

4. In a machine for automatically assembling valves within a cylinder head, a rotary index table, a plurality of longitudinally spaced cartridges carried by said table throughout its rotary movements, each cartridge containing valve assembly parts in telescoped relation, with the spacing of said cartridges corresponding to the longitudinal spacing of valves loosely inserted through a cylinder head with their stems depending therefrom, each of said cartridges consisting of an upright hollow cylinder slidably mounted upon said table, the upper end of which having a portion of increased internal diameter defining a support for a bottom sleeve, an intermediate spring retainer and a top coiled spring, a second hollow cylinder slidably mounted within said first cylinder providing a support below said sleeve for a top seal and a bottom split cylindrical locking key, and a shaft slidably mounted within said second cylinder adapted for axial alignment and movement into engagement with the stem of a valve loosely positioned within a cylinder head, means holding each valve against longitudinal displacement, and a plurality of rotatable cams respectively and separately engaging and supporting said cylinders and said shaft for effecting differential timed upward movements of said shaft and cylinders whereby said parts are projected upwardly upon the stem of each valve and secured thereon, with each spring engaging said cylinder head.

5. The valve assembly machine of claim 4, and a series of independent supports, one support for the upright hollow cylinders of all cartridges, one support for the second hollow cylinders of all cartridges, and another support for the shafts of all cartridges, each support operatively engaged respectively by one of said cams.

6. In a machine for automatically assembling valves within a cylinder head, a rotary index table, a plurality of longitudinally spaced cartridges carried by said table throughout rotary movements thereof, each cartridge containing valve assembly parts in telescoped relation, with the spacing of said cartridges corresponding to the longitudinal spacing of valves loosely inserted through a cylinder head with their stems depending therefrom, each of said cartridges consisting of an upright hollow cylinder slidably mounted upon said table, the upper end of which having a portion of increased internal diameter defining a support for a bottom sleeve, an intermediate spring retainer and a top coiled spring, a second hollow cylinder slidably mounted within said first cylinder providing a support below said sleeve for a top seal and a bottom split cylindrical locking key, and a shaft slidably mounted within said second cylinder adapted for axial alignment and movement into engagement with the stem of a valve loosely positioned within a cylinder head, retaining fingers holding said valves against longitudinal displacement, vertically spaced horizontally disposed platforms to which the lower ends of said first cylinders, second cylinders, and shafts are separately secured respectively, said cylinder platforms being apertured to slidably receive said second cylinders and shafts respectively, a rotatable shaft arranged below and transversely of the length of said platforms intermediate their ends, and cams of predetermined shape secured to said rotatable shaft and separately engaging said platforms respectively.

References Cited in the file of this patent

UNITED STATES PATENTS

| | | |
|---|---|---|
| 1,462,305 | Snyder | July 17, 1923 |
| 1,735,609 | Frederick | Nov. 12, 1929 |
| 2,228,930 | Robinson | Jan. 14, 1941 |
| 2,338,329 | Hermanns | Jan. 4, 1944 |
| 2,434,456 | Cook | Jan. 13, 1948 |
| 2,670,705 | Herrold | Mar. 2, 1954 |

FOREIGN PATENTS

| | | |
|---|---|---|
| 620,093 | Great Britain | Mar. 18, 1949 |